United States Patent [19]
Umemoto

[11] Patent Number: 5,194,804
[45] Date of Patent: Mar. 16, 1993

[54] APPARATUS FOR DETECTING THE VOLTAGE LEVEL OF A POWER SOURCE FOR A SPEED INDICATION DEVICE

[75] Inventor: Hideki Umemoto, Hyogo, Japan
[73] Assignee: Mitsubishi Denki K.K., Tokyo, Japan
[21] Appl. No.: 640,455
[22] Filed: Jan. 11, 1991
[30] Foreign Application Priority Data
Jan. 12, 1990 [JP] Japan .................................. 2-3371
[51] Int. Cl.$^5$ ...................... G01P 3/42; G01N 27/416
[52] U.S. Cl. ..................................... 324/160; 324/426; 324/500
[58] Field of Search ................ 324/160, 166, 426, 500
[56] References Cited
U.S. PATENT DOCUMENTS
4,906,055 3/1990 Horiucni .............................. 324/426

Primary Examiner—Walter E. Snow
Attorney, Agent, or Firm—Sughrue, Mion, Zinn, Macpeak & Seas

[57] ABSTRACT

Disclosed herein is a malfunction detection apparatus for use in an outboard engine or motor system having a tachometer. The apparatus includes a tachometer output circuit for applying the tachometer signal to the tachometer in accordance with the input signal attributing to the battery voltage or engine speed, the battery abnormality detecting circuit for detecting the abnormal condition of the battery voltage, to provide the detection signal and the switch circuit for suspending, in response to the detection signal, the application of the tachometer signal from the tachometer output circuit to the tachometer. The apparatus is advantageous in that the erroneous operation of the tachometer can be positively prevented.

1 Claim, 1 Drawing Sheet

APPARATUS FOR DETECTING THE VOLTAGE LEVEL OF A POWER SOURCE FOR A SPEED INDICATION DEVICE

BACKGROUND OF THE INVENTION

This invention relates to an apparatus for detecting malfunction of a speed indication device such as a tachometer which is provided mainly for an outboard motor or the like.

A conventional malfunction detection apparatus will be described with reference to FIG. 1 showing a circuit diagram therefor. Published Unexamined Japanese Patent Application No. Hei. 2-102374 discloses an example of such a conventional malfunction detection apparatus as shown in FIG. 1.

The conventional malfunction detection apparatus shown in FIG. 1 includes a 12 V battery 1, a generator 2 provided for an outboard engine or motor and a tachometer output circuit 3 the input and output sides of which are connected to the generator 2 and a tachometer 4, respectively.

The conventional apparatus thus organized operates as follows.

The tachometer output circuit 3 subjects the output signal of the generator 2 to signal processing such as waveform shaping to provide a tachometer signal indicative of the rotation speed (rpm) of the engine or motor. The tachometer signal thus provided is applied to the tachometer 4.

With such an outboard engine or motor system as described above, because such engine or motor is high in vibration and the tachometer is large in power consumption, there often occurs malfunctions or problems in the outboard engine system. As mentioned above, it is true that the tachometer is large in power consumption; however, the main cause of the malfunction or problem is not the mechanism of the tachometer per se but the disconnection of the battery due to the vibration, or the voltage drop in the battery due to discharge.

Accordingly, even when the tachometer operates erroneously for instance because the battery has been disconnected unintentionally, there may be a possibility that the operator may determine that the tachometer per se is out of order, and should be replaced by new one resulting in prolong a period of time for find out the true causes.

SUMMARY OF THE INVENTION

Accordingly, an object of this invention is to eliminate the above-described difficulty accompanying a conventional malfunction detection apparatus. More specifically, an object of the invention is to provide a malfunction detection apparatus in which the erroneous operation or replacement of a tachometer can be prevented positively.

The foregoing object of the invention has been achieved by the provision of an apparatus for detecting malfunction of a speed indication device includes an output circuit for applying an output signal to the speed indication device in accordance with an input signal attributing to a battery voltage and an engine speed, a battery abnormality detecting circuit for detecting an abnormal condition in an output voltage of the battery voltage to provide a detection signal and a switch circuit for suspending, in response to the detection signal, the application of the output signal from the output circuit to the speed indication device.

DESCRIPTION OF THE PREFERRED EMBODIMENT

Figure 1:
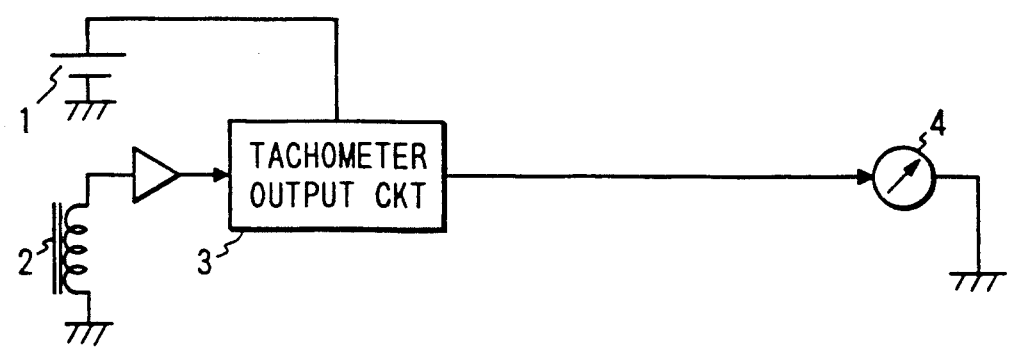
FIG. 1 is a circuit diagram showing a conventional malfunction detection apparatus.
Figure 2:
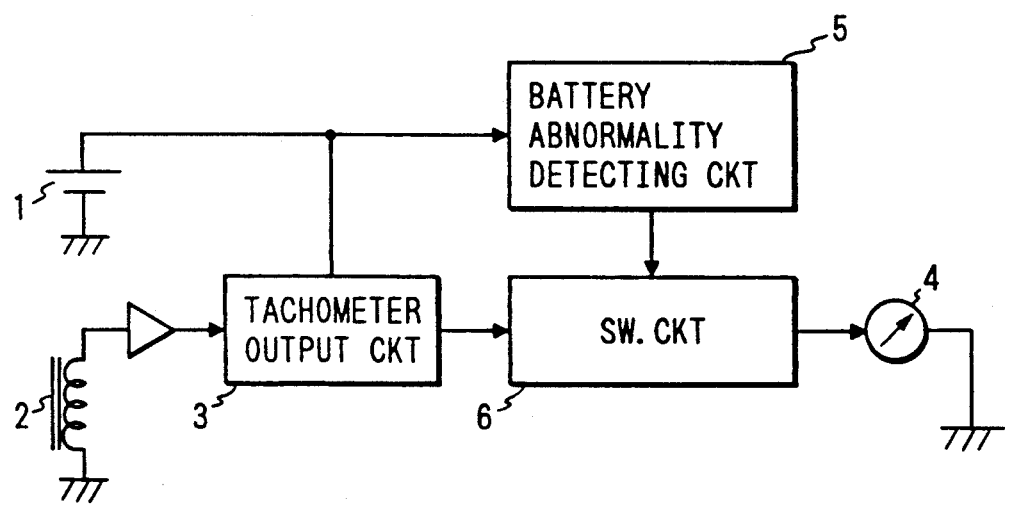
FIG. 2 is a circuit diagram showing an embodiment of a malfunction detection apparatus according to the present invention.

An embodiment of the present invention will be described with reference to FIG. 2 showing a circuit diagram therefor.

As shown in FIG. 2, the malfunction detection apparatus of the invention has the same battery 1, generator 2 and tachometer output circuit 3 as those in the conventional speed indication control device described before.

More specifically, the apparatus of the invention includes the above-described battery 1, the generator 2, the tachometer output circuit 3, a battery abnormality detecting circuit 5 connected to the battery 1 and a switch circuit 6. The input side of the switch circuit 6 is connected to the tachometer output circuit 3 and the battery abnormality detecting circuit 5, and the output side thereof is connected to the tachometer.

The operation of the speed indication control device thus organized will be described.

When the battery abnormality detecting circuit 5 detects an abnormal voltage of the battery 3 which is caused when the battery is disconnected by vibration or the voltage is decreased by discharged, it operates to turn off the switch circuit so as to suspend the application of the tachometer signal from the tachometer output circuit 3. As a result, the tachometer provides no indication, and therefore the operator can determine that the battery 1 is in abnormal condition.

With the embodiment of the invention, upon detection of the abnormal voltage of the battery, the application of the tachometer signal is forcibly stopped. Therefore, the erroneous operation of the tachometer 4 is prevented, and the abnormal condition of the battery can be detected without delay.

In the above-described embodiment, the tachometer output circuit 3 provides the tachometer signal according to the output signal of the generator 3; however, the invention is not limited thereto or thereby. That is, the tachometer output circuit can form the tachometer signal by using any other signal attributing to rotation.

The invention has been described with reference to the outboard motor; however, it goes without saying that the technical concept of the invention is applicable to other engines.

What is claimed is:

1. An apparatus for detecting malfunction of a speed indication device comprising:
   a generator for generating a signal corresponding to engine speed;
   an output circuit for receiving a battery voltage and said signal from said generator and for applying an output signal to said speed indication device in accordance with said battery voltage and said signal from said generator, to activate said speed indication device;

a battery abnormality detecting circuit for detecting an abnormal condition in an output voltage of said battery to provide a detection signal; and a switch circuit for suspending, in response to said detection signal, the application of said output signal from said output circuit to said speed indication device, to indicate an abnormal condition of said battery and to prevent an erroneous indication of engine speed by said speed indication device.

* * * * *